United States Patent [19]
Alles et al.

[11] Patent Number: 5,537,395
[45] Date of Patent: Jul. 16, 1996

[54] METHOD AND APPARATUS FOR SETTING A CHANNEL CONGESTION MESSAGE IN A WIRELESS MULTIPLE ACCESS PACKET DATA SYSTEM

[75] Inventors: Martin C. Alles; Paul C. Tse, both of Ottawa, Canada

[73] Assignee: Northern Telecom Limited, Montreal, Canada

[21] Appl. No.: 421,208

[22] Filed: Apr. 13, 1995

[51] Int. Cl.⁶ ...................................................... H04Q 7/34
[52] U.S. Cl. .......................... 370/17; 370/94.1; 370/95.3
[58] Field of Search ............................. 370/60, 94.1, 18, 370/93, 17, 95.1, 95.3; 379/39, 58, 59, 60, 63; 455/52.1, 53.1, 54.1, 56.1

[56] References Cited

U.S. PATENT DOCUMENTS

| 5,042,029 | 8/1991 | Hayakawa | 370/60 |
| 5,163,046 | 11/1992 | Hahne et al. | 370/79 |
| 5,282,196 | 1/1994 | Clebowicz | 370/58.1 |
| 5,457,680 | 10/1995 | Kamm et al. | 370/17 |
| 5,491,801 | 2/1996 | Jain et al. | 395/200.13 |

FOREIGN PATENT DOCUMENTS

| 0524675 | 1/1993 | European Pat. Off. . |
| 0621708 | 10/1994 | European Pat. Off. . |

OTHER PUBLICATIONS

"Congestion Control Through Input Rate Regulation", M. Sidi, W–Z Liu, and I. Gopal, Proceedings of GLOBECOM 1989, pp. 49.2.1–49.2.5, Dallas, TX, 1989.

"The 'Leaky Bucket' Policing Method in the ATM Network," G. Niestegge, Int'l Journal of Digital and Analog Communication Systems, vol. 3, pp. 187–197, 1990.

"Congestion Control for High Speed Packet Switched Networks," K. Bala, I. Cidon, and K. Sohraby, Proceedings of INFOCOM 1990, San Francisco, CA, 1990.

*Primary Examiner*—Melvin Marcelo
*Assistant Examiner*—Melissa Kay Carman
*Attorney, Agent, or Firm*—Lee, Mann, Smith, McWilliams, Sweeney & Ohlson

[57] ABSTRACT

A method of setting a channel congestion message in a wireless multiple access packet data system in which the channel congestion message is broadcast on the forward channel of the system and communication over the reverse channel is in the form of bursts. The method comprises the steps of: measuring an actual fraction of undecodable bursts on the reverse channel; measuring traffic parameters of the reverse channel; predicting from the measured traffic parameters an expected fraction of undecodable bursts for optimum throughput on the reverse channel; comparing the actual and expected fractions of undecodable bursts, and; setting the congestion message according to the result of the comparison. A system for implementing the method is also provided.

8 Claims, 6 Drawing Sheets

METHOD AND APPARATUS FOR SETTING A CHANNEL CONGESTION MESSAGE IN A WIRELESS MULTIPLE ACCESS PACKET DATA SYSTEM

This invention relates to multiple access communications systems particularly for conveying packet data over a noisy channel.

BACKGROUND OF THE INVENTION

The Cellular Digital Packet Data (CDPD) Specification allows for a mechanism that restricts registrations on a specific CDPD channel. A Channel Capacity flag is sent as part of the Channel Identification Message, which is broadcast on the forward channel at regular intervals. An M-ES (Mobile End-System) seeking CDPD service, and noting that this flag indicates full, will not attempt to access this channel. Instead the M-ES will either wait and keep examining the forward channel for changes in the Channel Identification Message, or will seek an alternative channel for its CDPD needs, according to the channel acquisition algorithm it uses.

The protocol used on the airlink for the CDPD Specification is DSMA/CD (Digital Sense Multiple Access with Collision Detection). A closely related protocol, CSMA/CD (Carrier Sense Multiple Access with Collision Detection) is used on many wired networks. To analyze the effects of fading and noise on the channel, the traditional approaches one may attempt, based on a natural evolution of the extensive work that exists in the literature on CSMA/CD, fail. A method of analysis that incorporates the fundamental ingredients of cellular channels i.e. fading and noise, has to be developed.

The present invention uses a method of analysis that incorporates the effects of fading and noise to derive an algorithm to set the Channel Capacity Flag.

Elementary types of congestion control such as those which consider the number of mobiles using the system at a particular time make inefficient use of the available channel capacity.

OBJECT OF THE INVENTION

The object of the invention is to provide an improved method of congestion control in a multiple access communications system.

SUMMARY OF THE INVENTION

According to the invention, there is provided a method of setting a channel congestion message in a wireless multiple access packet data system having forward and reverse channels, wherein the channel congestion message is broadcast on the forward channel and communication over the reverse channel is in the form of bursts, comprising the steps of:

measuring an actual fraction of undecodable bursts on the reverse channel;

measuring traffic parameters of the reverse channel;

predicting from the measured traffic parameters an expected fraction of undecodable bursts for optimum throughput on the reverse channel;

comparing the actual and expected fractions of undecodable bursts, and;

setting the congestion message according to the result of the comparison.

According to another aspect of the invention there is provided a wireless multiple access packet data system having forward and reverse channels, wherein a channel congestion message issued by a controller is broadcast on the forward channel and communication over the reverse channel is in the form of bursts, the controller comprising:

a first measuring means to measure an actual fraction of undecodable bursts on the reverse channel;

a second measuring means to measure traffic parameters of the reverse channel;

calculating means to predict from the measured traffic parameters an expected fraction of undecodable bursts for optimum throughput on the reverse channel;

comparison means to compare the actual and expected fractions of undecodable bursts and to set the congestion message according to the result of the comparison.

The congestion control developed here is particularly applicable to systems with a dedicated (cellular) channel for CDPD traffic. The algorithm may also be applied to systems using channel hopping, where a dedicated channel is not used but rather a cellular channel that has no voice traffic is dynamically assigned to transport the CDPD traffic. In the latter case certain parameters used in the algorithm are adjusted to account for channel hopping.

BRIEF DESCRIPTION OF THE DRAWINGS

The invention will be further understood from the following description with reference to the accompanying drawings in which.

DESCRIPTION OF THE PREFERRED EMBODIMENTS

Figure 1:
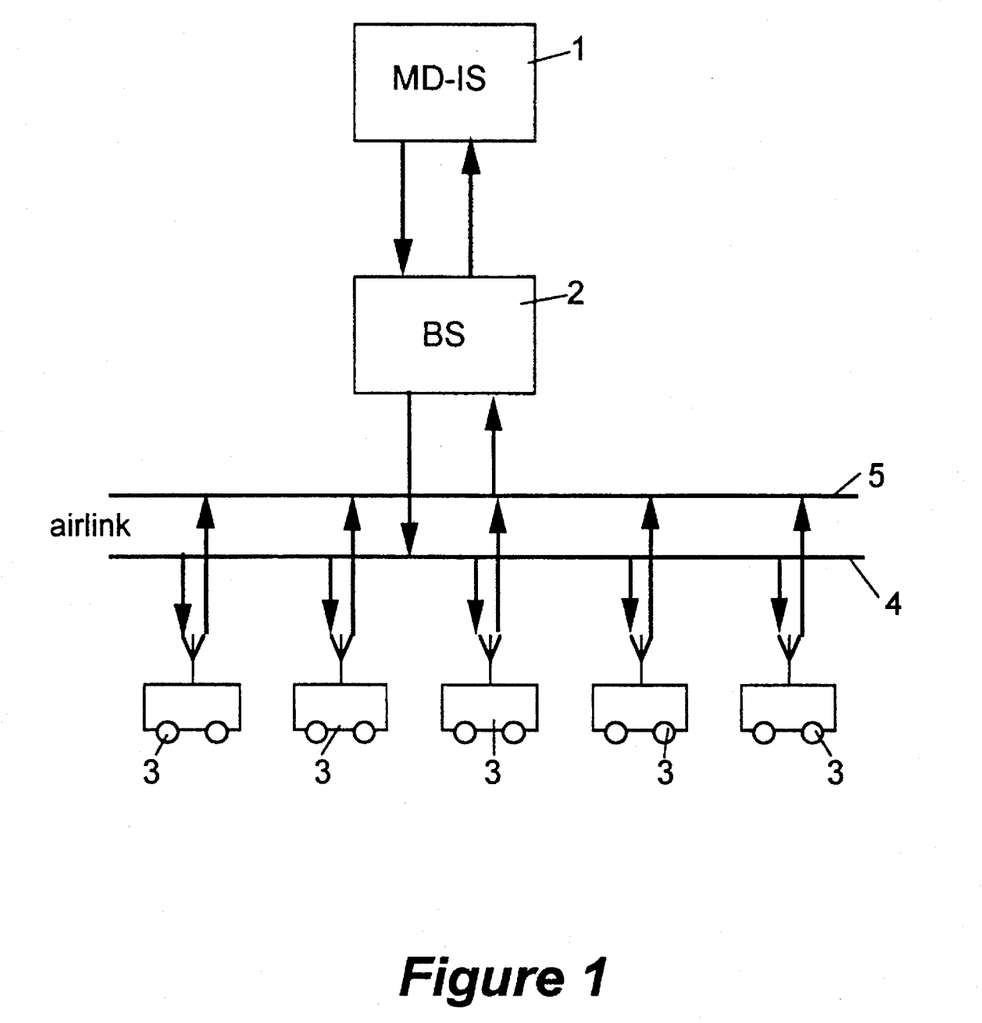
FIG. 1 shows, in schematic form, a communications system in which the invention may be used.

FIG. 1 shows one example of a CDPD system where the congestion control may be applied.

A base station 2 serves a plurality of mobile units 3. A pair of channels (4,5) are assigned to a group of mobile units; a forward channel 4 for communication from the base station 2 to the mobiles 3 (the downlink) and a reverse channel 5 for communication from the mobiles 3 to the base station 2 (the uplink). There may be other channel pairs for communication between the base station and other groups of mobiles.

Figure 2:
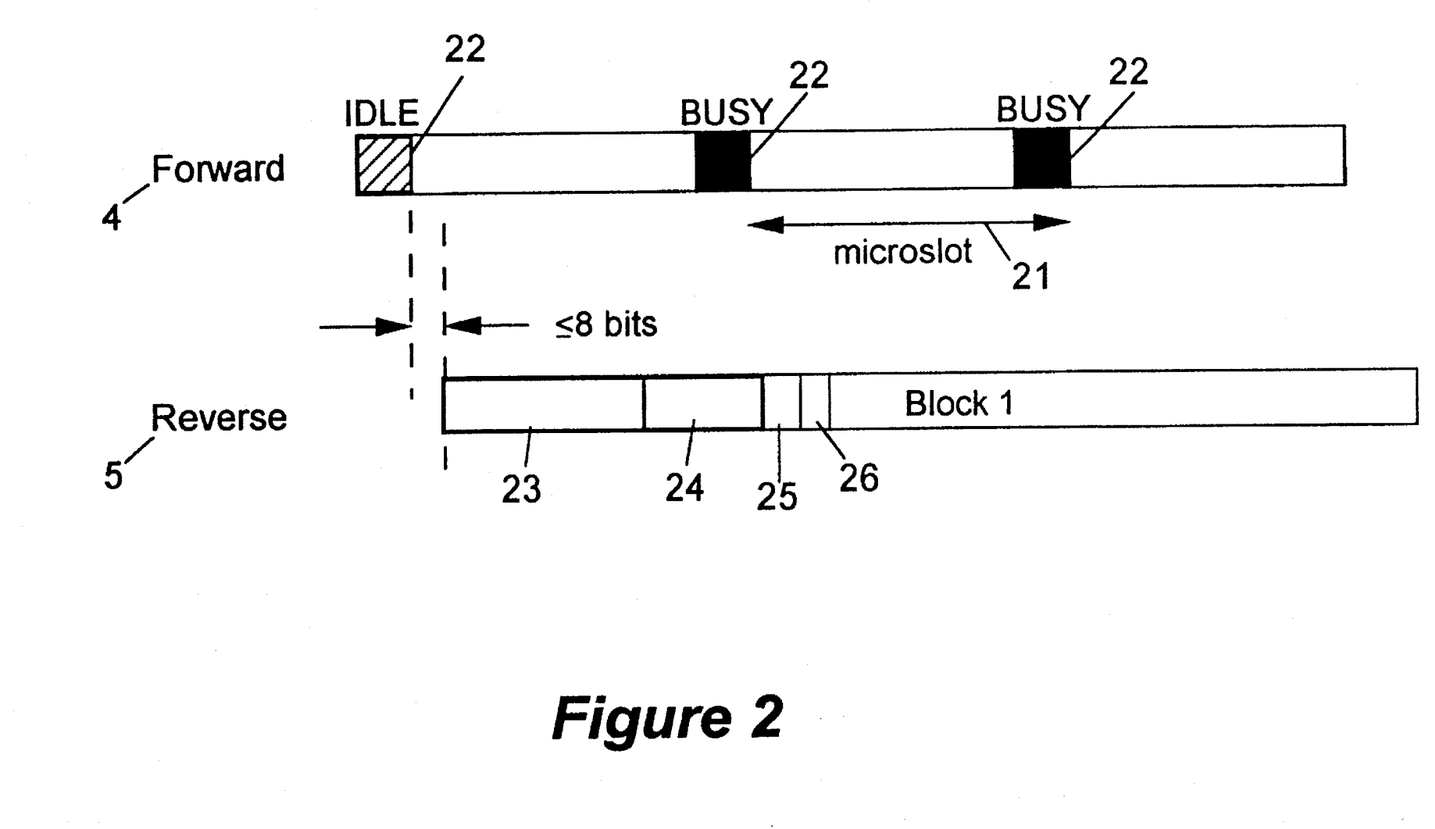
FIG. 2 and 3 show the relationship between channels used in the communications system.
Figure 3:
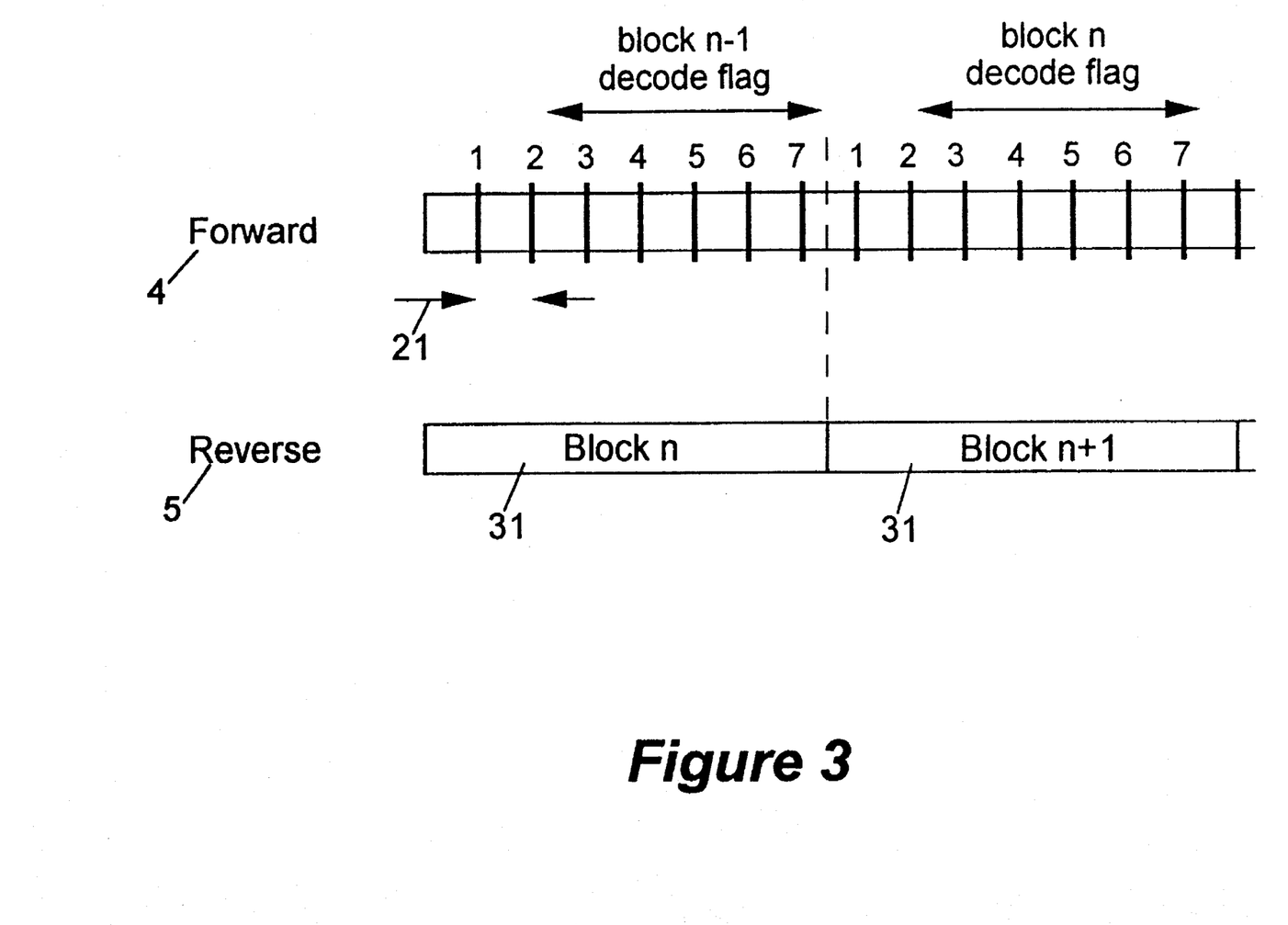

FIGS. 2 and 3 illustrate the format of the forward channel, and its relationship in time to the reverse channel. The forward channel transmission 4 is slotted in time: transmission of control flags 22 occurs every 60 bits. Each control flag 22 consists of a busy/idle flag and a decode status bit. The busy/idle flag indicates whether the reverse channel is busy, i.e. in use by one of the mobiles 3, or idle. A mobile wishing to transmit waits until it receives an 'idle' flag on the forward channel and then begins transmission on the reverse channel. Mobile terminal transmissions on the reverse channel 5 comprise a burst made up of a number of blocks 31, each block lasting for a number of microslots 21. Mobile transmissions begin with a preamble comprising a dotting sequence 23, a reverse synchronisation word 24, and a colour code 26. Continuity indicator bits 25 are interleaved into the burst to indicate to the base station that there are subsequent blocks to be transmitted. The CDPD specification uses Reed-Solomon encoded blocks.

Referring to FIG. 3, a group of decode status bits, each bit carried in a control flag (22, FIG. 2), form a decode flag. Decode flags allow the mobile to determine whether their previous transmission(s) were decoded successfully by the base station. In accordance with the CDPD Specification, the mobiles may perform a majority vote on the 5 bit decode status flag to determine the success of their transmissions.

In addition to the control flags, the forward channel periodically carries a Channel Identification Message which includes a Channel Capacity Flag to inform the mobiles of whether the channel is congested (and therefore cannot receive further registrations) or has capacity available. This message is transmitted as often as is necessary, the frequency being determined by the data service provider.

Channel congestion control is needed to ensure that the system has a high throughput, as close to the maximum possible, while remaining in stable equilibrium. The possibility of the system slipping into periods of degraded performance must certainly be avoided.

When the channel loading exceeds that corresponding to maximum throughput a further increase in the load will drive the system into a period of sustained degeneration. The role of the channel congestion control mechanism is to prevent this.

An important consideration of this congestion control is that access collisions are indicative of the congestion of the channel. Access collisions result when two or more mobiles receive a control flag indicating that the reverse channel is idle and attempt to access the reverse channel simultaneously. The frequency of access collisions can be shown to be an explicitly derivable function of the offered load and the transmission burst size profile. As the channel becomes more congested and mobiles attempt to access the reverse channel, the number of access collisions increases. The collisions result in short, undecodable bursts (of a specific length) on the reverse channel. When there is an access collision the mobiles concerned will wait to receive decode flags indicating that their transmissions were unsuccessful and then terminate their transmissions.

Although short undecodable bursts of a definite specifiable length are caused by access collisions, they may also be caused by noise or other disruptions to the channel. This is an important consideration in a mobile system where signal fading due to multipath, shadowing caused by obstructions to the wireless path and spurious noise all degrade the signal.

An undecodable burst is a burst transmitted by a mobile which comprises a sequence of blocks which are successfully decoded at the base station, followed by one or more blocks which are undecodable. On receiving an undecodable block the base station will indicate that the transmission was unsuccessful and cease further decoding on that burst. A decodable burst is one in which every block is successfully decoded at the base station. A short undecodable burst is one which typically comprises between one and three undecodable blocks and is caused either by an access collision or noise, as described above.

Figure 4:
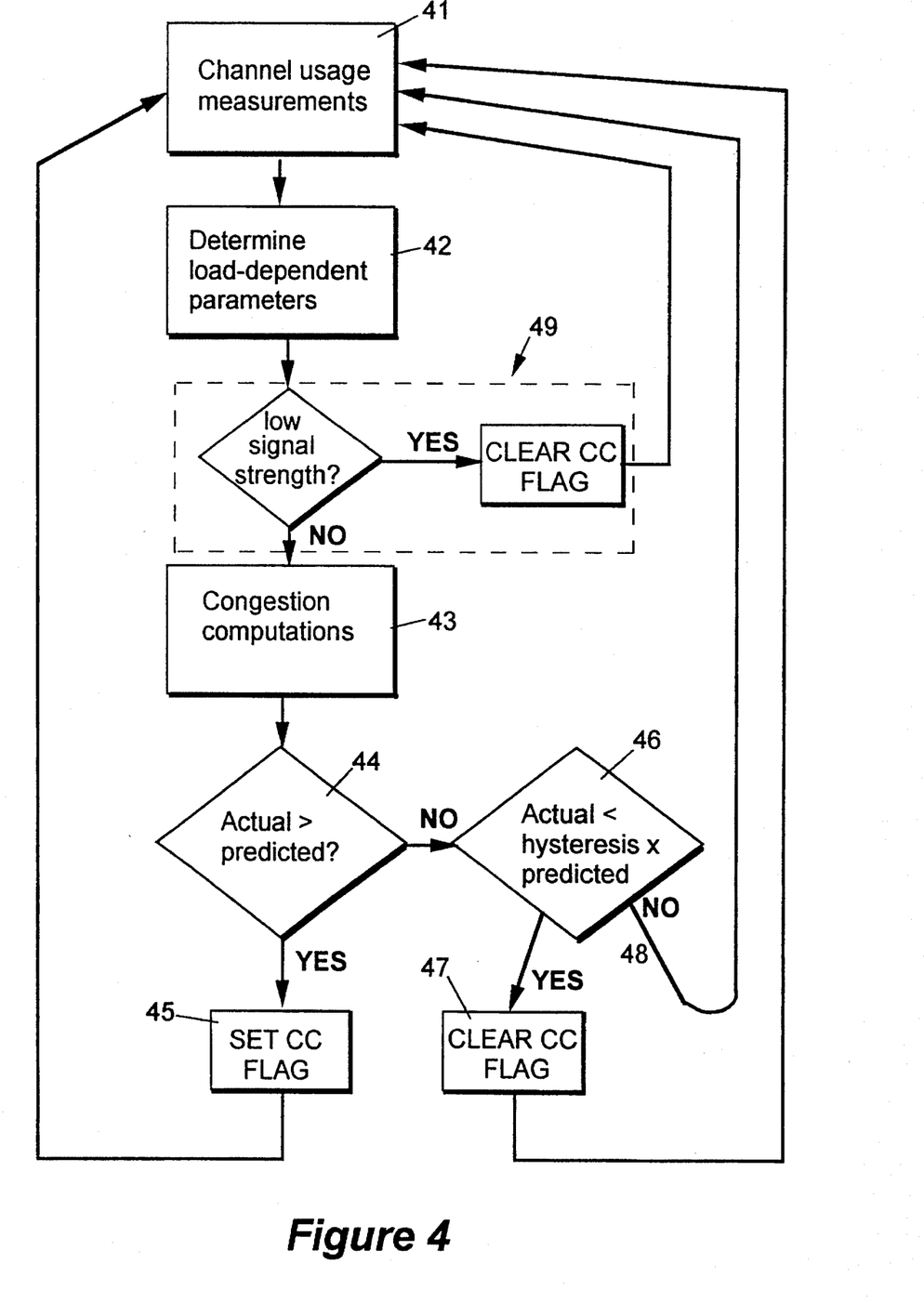
FIG. 4 is a flow-chart illustrating the steps of the method according to the invention.
Figure 5:
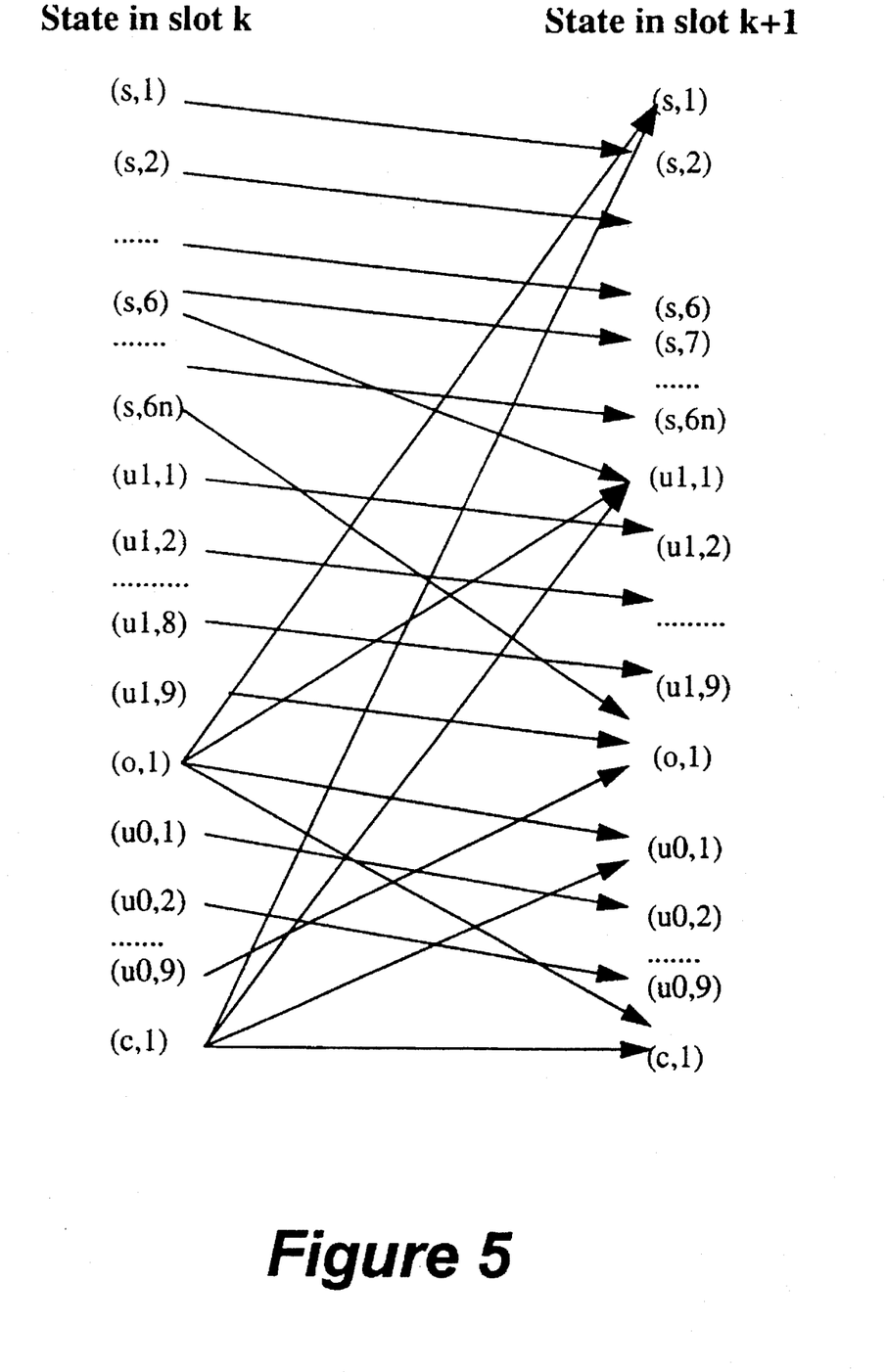
FIG. 5 is a chart to explain the derivation of the congestion control formulae.

A flow-chart outlining the congestion control method is shown in FIG. 4. This will now be briefly described.

The method is executed cyclically over a particular time period (referred to herein as $T_{alg}$). The time period $T_{alg}$ is determined such that the channel loading profile does not change significantly over this interval: i.e. the statistics of the bursts transmitted on the reverse channel vary slowly with respect to the interval $T_{alg}$.

After each execution of the method an unambiguous decision is made as to whether the channel congestion condition broadcast to all mobiles should be set, cleared or allowed to remain as it is.

The Channel Capacity Flag is used by the CDPD specification to prevent further mobiles from registering with the system on the particular congested channel. The mobiles can then either wait for this channel to be declared as uncongested (channel capacity available), or seek another channel.

The base station maintains measures of channel usage 41. These measurements are collected over the period $T_{alg}$ to form a representative figure, and used to determine 42 a set of load dependent parameters that are employed in the control. One of the base station measurements gives the fraction of time for which the reverse channel is actually occupied by short undecodable bursts. A set of calculations is performed 43 to predict the expected fraction of time that the reverse channel should be occupied by short undecodable bursts, based on the present channel conditions, for maximum throughput. At 44 a comparison is made between the measured and predicted values for undecodable bursts. If the measured value exceeds the predicted, the Channel Capacity Flag is set 45. If the measured is less than the predicted value by a suitable fraction 46 then the flag is cleared 47. Otherwise the flag remains in its present state 48.

Figure 6:
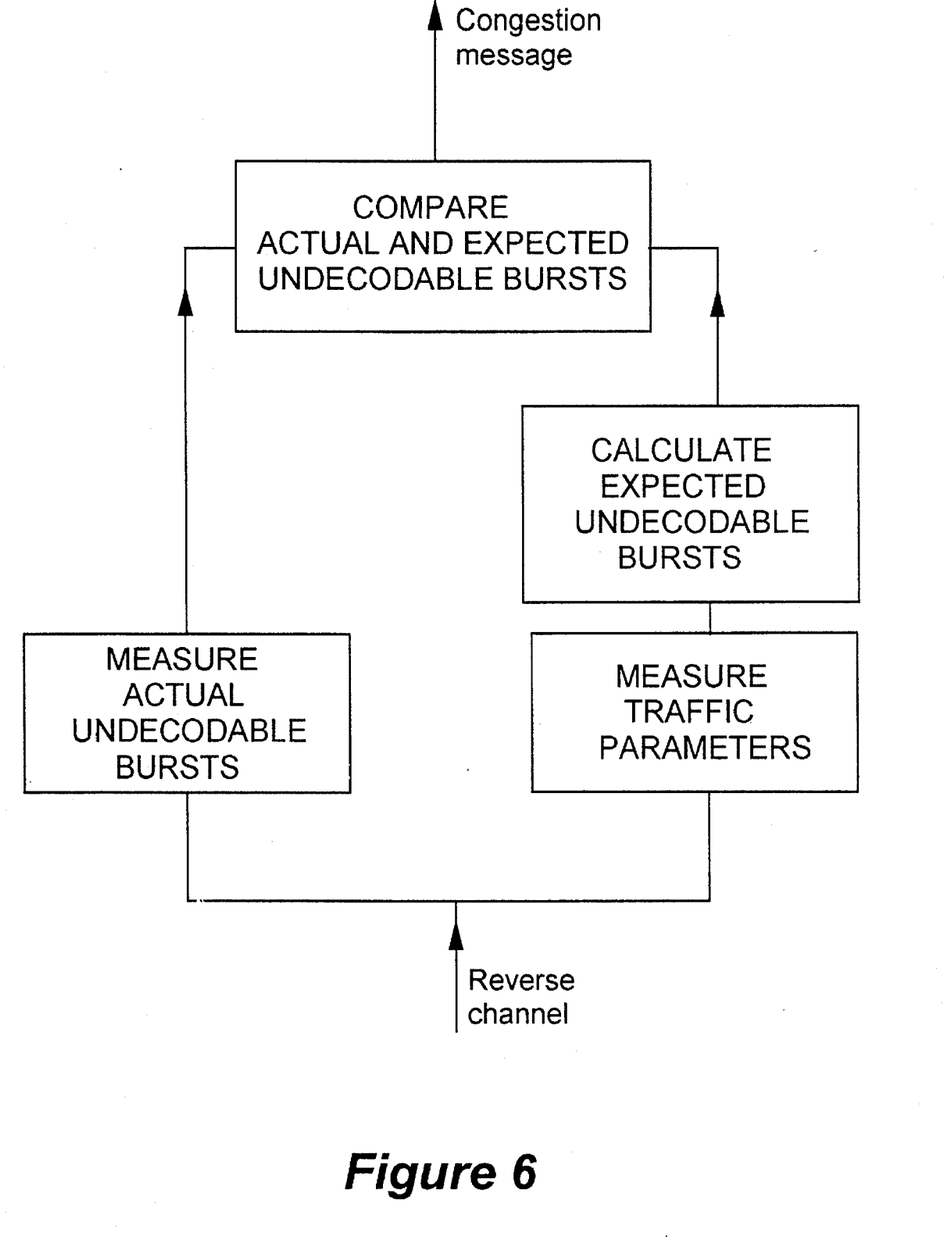
FIG. 6 is a diagram of the functional blocks which perform the congestion control.

FIG. 6 shows the function blocks which are required to perform the congestion control in the communication system.

In the CDPD specification, the actual setting of the Channel Capacity Flag is done by the Mobile Data—Intermediate System (MD-IS) (1, FIG. 1). The base station BS informs the MD-IS that the flag should be set, cleared or left as it is. However, in the more general case (not CDPD) the base station could have the means to set the flag or issue a "channel congested" message to all the mobiles listening to its transmissions.

The method will now be described in more detail.

In the first step, the base station maintains measures of channel usage over a period $T_{alg}$ and determines a set of load dependent parameters that are employed in the control. Each of the measures and the derivation of the load-dependent parameters will now be described.

For use in a preliminary (non-essential) step of the control, where the strength of received bursts is monitored, the BS measures:

$N_{tot}$—total number of decodable bursts received over $T_{alg}$, $N_R$—number of bursts received with Received Signal Strength Indicator (RSSI) less than RSSI_LOW, where RSSI_LOW is a data filled value, and calculates:

$f_{RL}$—fraction of bursts over $T_{alg}$ for which RSSI is less than RSSI_LOW, where:

$$f_{AL} = \frac{N_R}{N_{tot}}$$

To measure the actual fraction of time that the reverse channel is occupied by short undecodable bursts, the BS measures:

$N_c$—number of undecodable bursts of length greater than 1 Reed Solomon (RS) block and less than 3 RS blocks, $T_c$—time corresponding to a burst whose length corresponds to an access collision, and calculates:

$C_o$—the fraction of time (over $T_{alg}$) for which the reverse channel is occupied by undecodable bursts of length greater than 1 RS blocks and less than 3 RS blocks (short undecodable bursts), where:

$$C_O = \frac{T_C K_U N_C}{T_{alg}}$$

in which $K_u$ is an optional parameter which may be used to deactivate the control. To do this the value of this parameter is set to a number much larger than unity. When the control is not to be so deactivated the value of $K_u$ is set to unity.

Note that the method of recognizing bursts that appear like an access collision burst may differ. The preferred method indicated here assumes that bursts can be recognized only as less, equal or greater than a multiple of RS blocks. These numbers 1 and 3 have been used to isolate the access collision bursts. In what follows, "short undecodable bursts" will refer to bursts that satisfy these constraints.

Additionally, the BS measures other characteristics of channel usage to derive a set of load-dependent parameters that are used to predict the fraction of undecodable bursts on the reverse channel at optimum throughput.

The first of these determines a representative number of blocks in a burst. This may be done by averaging the length of all decodable bursts i.e. bursts for which every block is decodable. The averaging is a form of weighted average that favours the longer sized bursts. The BS measures:

$d_l$—number of undecodable bursts of length $l$, $b_{max}$—size (in RS blocks) of the largest burst received over $T_{alg}$, and calculates:

$\eta$—weighted average burst length (in RS blocks) of all decodable bursts in (RS blocks).

$$\eta = \frac{1}{N_{tot} b_{max}} \sum_l l^2 d_l$$

A calculation is also made to determine the fraction of blocks transmitted on the reverse channel that are undecodable. The BS measures:

$u_l$—number of undecodable bursts of length $l$ RS blocks where $l$ is greater than or equal to 3, $B_{tot}$—total number of blocks received (exclusive of any blocks contained in short undecodable bursts), and calculates:

p—the fraction of RS blocks that are undecodable at the BS where $$p = \sum_l \frac{u_l}{B_{tot}}$$

This is simply the total number of undecodable blocks divided by the total number of blocks received, which is the observed block error rate, and will be referred to as p.

To compute the average number of blocks in a frame, the BS measures:

$F_{tot}$—total number of frames received
and calculates:

$\beta$—average number of blocks in a frame where $$\beta = \frac{B_{tot}}{F_{tot}}$$

These are the only reverse channel load dependent measurements required for implementing the congestion control. The control will now be considered, with reference to specific variables that are employed in the control.

The following are variables that are data filled:

$K_{RL}$—a threshold that is used in activating the primary congestion control algorithm, and is based on the fraction of bursts received with low RSSI, $K_u$—a threshold used in deactivating the primary congestion control algorithm, $\mu$—the number of slots (microslots) in an access collision burst.

$K_{sa}$—a factor which absorbs the necessity to (1) have the non-persistent DSMA/CD protocol operate in a region of nearly stable equilibrium at a throughput close to but less than maximum, (2) alleviate problems associated with long burst delays, and which may (3) be adjusted to compensate for the loss in throughput associated with channel hopping. If throughput is desired exactly at the maximum, this factor will be set to unity. However in most practical cases, one would trade-off the throughput with system stability, so that a number between unity and zero would be used.

$K_{cf}$—a factor that permits the clearing and setting of the CC Flag to be done at the extremes of a window of non-zero size. This is used to permit some hysterisis in the operation of the algorithm, $\zeta$—the number of slots in an RS block. Note that this need not be an integer, The following are variables that occur in the algorithm implementation; many are transparent when a table look-up is implemented.

$S_o$—the observed throughput of decodable bursts, $S_p$—the predicted throughput of decodable bursts, $C_o$—the observed throughput of short undecodable bursts, $C_a$—the predicted throughput of access collision bursts, $C_p$—the predicted throughput of short undecodable bursts, $C_N$—the predicted throughput of short undecodable bursts exclusive of access collisions (the bursts of length equivalent to access collisions but caused by channel noise or fading or both), $\lambda_m$—the expected load corresponding to maximum throughput for a given value of $\eta$.

$\lambda_{set}$—an offered load used to compute the decision threshold for the allowable access collision frequency, $\lambda$—the average number of bursts generated by the M-ES source per microslot.

A preliminary stage of the control, which although not essential enhances performance, is to monitor the strength of received signals from mobiles, and use this to decide whether the main channel congestion algorithm should be run.

If the fraction of bursts having a low RSSI is greater than a particular threshold, then the channel congestion condition is cleared, and there is no need to proceed with the main channel congestion determination. However, if this condition is not met, i.e. there is a significant fraction of bursts received with an acceptable RSSI, the main stage of the method determines how congested the channel is. This is done so that the channel congested indication is not issued where a situation that appears similar to congestion is actually caused by poor channel conditions, and not access collisions.

| IF | $f_{RL}$, $K_{RL}$ | THEN CLEAR Channel Congestion Flag ELSE Begin main stage of the method |
|---|---|---|

Next, the values of burst size and p (available from the parameters calculated above) are used to determine the channel loading that results in optimum throughput. Two alternative methods of implementing this are by calculation, using the parameters above, or by approximation. Each alternative will now be explained.

For either alternative, it is necessary to first perform the following modulo division:

$$\eta = m\beta + r$$

where m and r are integers.

Alternative 1

Here we compute the following, where $i_1$, $i_2$ are intermediary values indicated for simplicity of presentation.

$$i_1 = \frac{\lambda p(1-p)}{\zeta\lambda[1-((1-p)^\eta + p(1-(1-p)^\eta))] + \exp(\lambda)p - \mu p(1 + \lambda(1-p)^\eta - \exp(\lambda))} \quad (EQ1)$$

$$i_2 = \left[ \zeta\beta \left[ \frac{(1-p)^{m\beta} - 1}{(1-p)^\beta - 1} \right] (1-p)^{(\beta-1)} + r\zeta(1-p)^{\eta-1} \right] i_1 \quad (EQ2)$$

Alternative 2

In this case, the value of loading that results in the maximum throughput is derived approximately. This is achieved by solving the following equation for $\lambda_m$:

$$(\mu+1)\lambda_m \exp(\lambda_m) = (\mu+1)\exp(\lambda_m) - \mu$$

This results in a close approximation to $\lambda_m$ provided an accurate determination of $\mu$ is available.

The algorithm now proceeds, having used one of the two alternatives indicated above to compute $\lambda_m$. A loading somewhat less than the loading for maximum throughput is desirable. This is because if the loading is at the maximum, the system has no allowance for a further increase in load which could take the system into unstable equilibrium. By allowing a loading only up to a value near but less than that achieving maximum throughput, this possibility is mitigated. This is achieved by multiplying $\lambda_m$ by a factor $K_{sa}$ such that:

$$\lambda_{set} = K_{sa}\lambda_m$$

This value for the load, together with the parameters derived earlier, is substituted into an expression that predicts the fraction of time that the reverse channel should be occupied by short undecodable bursts. As explained earlier, this prediction accounts for undecodable bursts that result from both access collisions and noise on the channel, since the decoder at the BS cannot distinguish between the two. The predicted fraction of time that the reverse channel should be occupied by short undecodable bursts, $C_p$, is given by:

$$C_p = \frac{\mu p \exp(\lambda_{set})(1 - \exp(-\lambda_{set})) - \lambda_{set}\exp(-\lambda_{set}) + p(\lambda_{set}\exp(-\lambda_{set}))}{\zeta\lambda_{set}[1 - ((1-p)^\eta - p(1-(1-p)^\eta))] + \exp(\lambda_{set})p - \mu p(1 + \lambda_{set}(-p)^\eta - \exp(\lambda_{set}))} \quad (EQ3)$$

The final step of the algorithm is a comparison between the measured and predicted values of the fraction of time for which the reverse channel is occupied by undecodable bursts, and a decision on the state of the channel congestion flag. The flag is:

(i) set if the measured value $C_o$ exceeds the predicted value $C_p$, (ii) cleared if the measured value $C_o$ is less than the predicted value $C_p$ by more than a particular amount (a hysteresis margin to allow the system to settle), or otherwise (iii) left at its present state.

This congestion control method may also be applied where the reverse channel transmissions are not structured as fixed size blocks, but as arbitrary sized bursts. In this case, the base station uses some mechanism to indicate continued transmission success, and the mobile monitors this mechanism (this could even be the decode status bits of control flags such as used in CDPD) to keep track of the success of its transmission. When failure is indicated, the mobile stops transmission and the base station discards the entire burst. In this interpretation, the block error rate computation is replaced by a burst error rate computation, where one simply counts the fraction of successful bursts, and all equations are correspondingly modified.

DERIVATION OF THE CONGESTION CONTROL FORMULAE

Notation

The notation used here to categorize a particular reverse channel state is of the form (state type, slot number in that state). The state types are classified as follows:

s—Successful state
U0—Unsuccessful state due to access collisions
U1—Unsuccessful state due to channel conditions
c—Clear state
o—Open state With this notation, the reverse channel state in a particular slot can be captured succinctly: (s,7) for instance, denotes that the particular slot is the seventh slot of a successful transmission. Note that a successful slot may be followed by a sequence of unsuccessful slots prior to termination of the burst (due to channel noise), so that successful slots do not necessarily assure a complete and successful transmission burst. For example, if the number of slots in a scheduled burst is 60, with the number of blocks approximately equal to 10, and if it is assumed that a block consists of exactly 6 microslots, (s,60) would indicate that the current slot terminates a successful burst; (s,6) on the other hand, may be followed by the sequence of states:

(u1,1),(u1,2),(u1,3),(u1,4),(u1,5),(u1,6),(u1,7),(u1,8),(u1,9),(o,1), . . .

resulting in the transmission of an unsuccessful burst.

For simplicity a number of slots per block equal to 6, and a number of slots in unsuccessful states equal to 9 have been used. These assumptions are used simply for explanation of the technique, and are not used in the more general derivation that follows.

Transition Probabilities

The state transition probabilities are developed for each state shown. Let P(x,y) denote the probability of a particular slot being in state (x,y) at equilibrium. Assume that a reverse channel block consists of $\zeta$ slots. Then we can write, assuming Poisson arrivals in each slot at a mean rate of $\lambda$ bursts per slot time, that $$P(s,1) = \lambda \exp(-\lambda)(1-p)[P(0,1)+P(c,1)] \quad \text{(EQ4)}$$

Note that the analysis can also be easily performed for other arrival distributions, following the same general method.

Now the state $(s,\zeta)$ can result in either $(s,\zeta+1)$ or $(u1,1)$ with probability $(1-p)$, so that $$P(s,\zeta+1) = (1-p)P(s,\zeta) \quad \text{(EQ5)}$$

All states $(s,\zeta+1)$ through $(s,2\zeta)$ have equal probabilities, and the same holds true for all states $(s,v+1)$ through $(s,2v)$, except where $v=\zeta l+1, \ldots$; where $l=1,2,3 \ldots$ in which case $$P(s,\zeta l+1) = (1-p)P(s,\zeta l) \quad \text{(EQ6)}$$

We also have that $$P(s,\zeta\eta) = P(s,\zeta\eta-1) \quad \text{(EQ7)}$$

and $$P(u1) = p[P(s,\zeta)+P(s,2\zeta)+P(s,3\zeta)+\ldots+P(s,(\eta-1)\zeta)] + p\lambda \exp(-\lambda)[P(o,1)+P(c,1)] \quad \text{(EQ8)}$$

Assume that the undecodable states occupy a contiguous set of $\mu$ slots. Then $$P(u1, h+1) = P(u1,h) \quad \text{(EQ9)}$$

for $h=1,2,\ldots \mu-1$. Similarly, $$P(u0, h+1) = P(u0,h) \quad \text{(EQ10)}$$

and $$P(u0,1) = (1-\exp(-\lambda)-\lambda\exp(-\lambda))[P(o,1)+P(c,1)] \quad \text{(EQ11)}$$

Further, $$P(o,1) = P(s,\zeta\eta) + P(u1,\mu) + P(u0,\mu) \quad \text{(EQ12)}$$

and $$P(c,1) = \exp(-\lambda)[P(o,1)+P(c,1)] \quad \text{(EQ13)}$$

Throughput

The set of equations developed earlier can be reduced to the following:

$$\begin{bmatrix} \left(\dfrac{\zeta(1-(1-p)^\eta)}{p}\right) & \mu & 1 \\ (1-p)^{\eta-1} & 1 & \exp(-\lambda)-1 \\ 1-(1-p)^{\eta-1} & -1 & 1-\exp(-\lambda) \\ & & (1+\lambda-p\lambda) \end{bmatrix} \begin{bmatrix} P(s,1) \\ P_1 \\ P_0 \end{bmatrix} = \begin{bmatrix} 1 \\ 0 \\ 0 \end{bmatrix} \quad \text{(EQ14)}$$

Here $P_0$ and $P_1$ are given by:

$$P_0 = [P(o,1)+P(c,1)] \quad \text{(EQ15)}$$

and:

$$P_1 = [P(u0,1)+P(u1,1)] \quad \text{(EQ16)}$$

$P(s,1)$ is now computable. The solution for $P(s,1)$ is:

$$P(s,1) = \frac{\lambda p(1-p)}{\zeta\lambda[1-((1-p)^\eta + p(1-(1-p)^\eta))] + \exp(\lambda)p - \mu p(1+\lambda(1-p)^\eta - \exp(\lambda))} \quad \text{(EQ17)}$$

The total probability of access collision states (or the frequency of such states) can also be obtained from the earlier equations, as:

$$C_a = \mu P(u0,1) = \mu(1-\exp(-\lambda)-\lambda\exp(-\lambda))P_0 \quad \text{(EQ18)}$$

which simplifies to:

$$C_a = \frac{\mu p \exp(\lambda)(1-\exp(-\lambda)-\lambda\exp(-\lambda))}{\zeta\lambda[1-((1-p)^\eta - p(1-(1-p)^\eta))] + \exp(\lambda)p - \mu p(1+\lambda(1-p)^\eta - \exp(\lambda))} \quad \text{(EQ19)}$$

When an undecodable block occurs, successfully transmitted MDLP frames in previous blocks contained in the same burst are not retransmitted; with this consideration accounted for, the throughput can be determined. Let the number of blocks in an MDLP frame be $\beta$, and let:

$$\eta = m\beta + r \quad \text{(EQ20)}$$

where $r < p$, and $m$ are integers ($\eta = r \mod (\beta)$). The conditional probability that a given block is not retransmitted is the probability that every following block in a particular $\beta$ block segment is transmitted successfully; this should be contrasted with the case where the non-retransmission of a given block is contingent on the successful transmission of every following block in that burst.

Collecting appropriate terms and simplifying, the throughput in this case, $S_p$, may be written as:

$$S_p = \left[ \zeta\beta \left[ \frac{(1-p)^{m\beta}-1}{(1-p)^\beta - 1} \right] (1-p)^{(\beta-1)} + r\zeta(1-p)^{\eta-1} \right] P(s,1) \quad \text{(EQ21)}$$

where $P(s,1)$ is as given in (EQ17).

The frequency of short undecodable bursts, which is the sum of the probabilities of access collision bursts, and short bursts of the same length that are undecodable due to fading or noise or both can be expressed as:

$$C_p = C_a + C_N$$

where $C_a$ is the access collision frequency, and $C_N$ is the frequency of short bursts of the same length that are undecodable due to fading or noise or both. Now $$C_N = \frac{p\lambda\exp(-\lambda)}{\zeta\lambda[1-((1-p)^\eta - p(1-(1-p)^\eta))] + \exp(\lambda)p - \mu p(1+\lambda(1-p)^\eta - \exp(\lambda))} \quad (EQ22)$$

so that we can write:

$$C_p = \frac{\mu p\exp(\lambda)(1-\exp(-\lambda) - \lambda\exp(-\lambda)) + p\lambda\exp(-\lambda)}{\zeta\lambda[1-((1-p)^\eta - p(1-(1-p)^\eta))] + \exp(\lambda)p - \mu p(1+\lambda(1-p)^\eta - \exp(\lambda))} \quad (EQ23)$$

As explained previously, it is necessary to consider the sum of the access collision frequency and the frequency of undecodable bursts of length $\mu$ slots caused by noise or channel fading, since the RS decoder cannot distinguish between the two cases, but simply recognizes a failed, small burst of length $\mu$ slots.

It is important to consider briefly the form of the functions $S_p$ and $C_p$. The function $S_p$ is convex upward as a function of the load $\lambda$, whereas $C_p$ is an increasing function of $\lambda$. If the load slips past the loading at which the maximum value of $S_p$ is reached, the throughput will decrease, which results in a further increase in the load. This process will continue with a sustained period of low throughput, and degenerate behaviour exhibited by the system. It is thus important to balance the desire to keep the loading near that which causes maximum throughput, against allowing small load increases to degrade the system. The occurrence of short undecodable bursts is observable by the base station, and hence is used in this algorithm to point directly to the loading, which it can, since $C_p$ is an increasing function of the load $\lambda$.

What we claim:

1. A method of setting a channel congestion message in a wireless multiple access packet data system having forward and reverse channels, wherein the channel congestion message is broadcast on the forward channel and communication over the reverse channel is in the form of bursts, comprising the steps of:

measuring an actual fraction of undecodable bursts on the reverse channel;

measuring traffic parameters of the reverse channel;

predicting from the measured traffic parameters an expected fraction of undecodable bursts for optimum throughput on the reverse channel;

comparing the actual and expected fractions of undecodable bursts, and;

setting the congestion message according to the result of the comparison.

2. A method of setting a channel congestion message as claimed in claim 1 wherein the bursts each comprise a group of blocks and the step of measuring traffic parameters comprises determining an average number of blocks in each burst and determining the fraction of blocks which are undecodable.

3. A method of setting a channel congestion message as claimed in claim 1 wherein the step of measuring an actual fraction of undecodable bursts on the reverse channel comprises measuring an actual fraction of short undecodable bursts representative of reverse channel access collisions.

4. A method of setting a channel congestion message as claimed in claim 1 wherein the step of predicting the expected fraction of undecodable bursts on the reverse channel accounts both for undecodable bursts which are due to reverse channel access collisions and to undecodable bursts which are due to noise on the reverse channel.

5. A method of setting a channel congestion message as claimed in claim 1 wherein the congestion message is set if the actual fraction of undecodable bursts exceeds the expected fraction of undecodable bursts.

6. A method of setting a channel congestion message as claimed in claim 1 wherein if the actual fraction of undecodable bursts does not exceed the expected fraction of undecodable bursts, and the actual fraction is less than the expected fraction of undecodable bursts by a predetermined margin, the congestion message is cleared.

7. A method of setting a channel congestion message as claimed in claim 1 wherein there is an additional step of measuring a fraction of bursts on the reverse channel with a low signal strength and clearing the congestion message if that fraction is greater than a predetermined threshold.

8. A wireless multiple access packet data system having forward arid reverse channels, wherein a channel congestion message is broadcast on the forward channel and communication over the reverse channel is in the form of bursts, the system comprising:

a first measuring means to measure an actual fraction of undecodable bursts on the reverse channel;

a second measuring means to measure traffic parameters of the reverse channel;

calculating means to predict from the measured traffic parameters an expected fraction of undecodable bursts for optimum throughput on the reverse channel;

comparison means to compare the actual and expected fractions of undecodable bursts and to set the congestion message according to the result of the comparison.

* * * * *